Dec. 30, 1941.   F. L. HILL ET AL   2,268,253
WINDSHIELD WIPER
Filed May 20, 1940   6 Sheets-Sheet 1

INVENTORS
F. L. HILL
C. F. THOMPSON
BY H. J. Jeandron
ATTORNEY

Dec. 30, 1941.   F. L. HILL ET AL   2,268,253
WINDSHIELD WIPER
Filed May 20, 1940   6 Sheets-Sheet 2

INVENTORS
F. L. HILL
C. F. THOMPSON
BY H. T. Jeanson
ATTORNEY

Dec. 30, 1941.  F. L. HILL ET AL  2,268,253
WINDSHIELD WIPER
Filed May 20, 1940  6 Sheets-Sheet 3

FIG. 9.

INVENTORS
F. L. HILL
C. F. THOMPSON
BY
H. J. Gendron
ATTORNEY

Dec. 30, 1941.   F. L. HILL ET AL   2,268,253
WINDSHIELD WIPER
Filed May 20, 1940   6 Sheets-Sheet 5

FIG. 11.

INVENTORS
F. L. HILL
C. F. THOMPSON
BY H. J. Jeandron
ATTORNEY

Dec. 30, 1941.  F. L. HILL ET AL  2,268,253
WINDSHIELD WIPER
Filed May 20, 1940  6 Sheets-Sheet 6

INVENTORS
F. L. HILL
C. F. THOMPSON
BY H. T. Jeanson
ATTORNEY

Patented Dec. 30, 1941

2,268,253

UNITED STATES PATENT OFFICE 2,268,253

WINDSHIELD WIPER

Frank L. Hill, Garden City, and Clifford F. Thompson, Westbury, N. Y., assignors to Air Associates, Inc., Garden City, N. Y.

Application May 20, 1940, Serial No. 336,148

8 Claims. (Cl. 15—250.4)

This invention relates to mechanism for wiping a windshield, and for distributing a fluid over the surface thereof.

On water supported or air supported boats that come into contact with salt water spray there is a saline crystal formation which adheres to the windshield obscuring or greatly reducing the degree or area of vision. Also on airplanes in general there is an ice formation which adheres to the windshield, which may form almost instantly due to the high rate of travel and the high altitudes encountered. The ice formation may be so rapid that where a wiper is in use the wiper blade will adhere to the glass and stop the wiper, defeating the function of the apparatus. Other limitations of the present types of wipers in use for boats and airplanes are the limited area which they are effective in and the lack of efficient operation.

According to the present invention, the formation of a saline crystal formation on a windshield is prevented by feeding a fluid to the effected area of the windshield by means of a rapidly rotating wiper blade, thus permitting the wiper blade with the assistance of the fluid to clear an effective area of the windshield. The formation of ice is also prevented by feeding an antifreeze fluid to the effected area by means of a rapidly rotating wiper blade, thus distributing the fluid over the ice and eliminating the ice formation adhering to the windshield. To prevent the wiper blade from adhering to the glass due to ice formation, it is kept clear of the glass when inoperative, and is permitted to move away from the glass during operation to pass over any obstruction such as ice formation. Thus the wiper blade movement is insured under all reasonable conditions.

An object of the present invention is to provide a simple, compact and reliable apparatus for expeditiously clearing the windshield.

Another object of the present invention is to provide a simple and effective device to feed a fluid to the windshield to thereby assist the wiper in clearing the surface thereof.

Another object is to provide a simple and effective means of insuring the initial movement of the wiper blade.

Another object is to provide a simple and effective means of insuring a continued operation regardless of obstructions on the windshield.

A further object is to limit the distribution and application of the fluid to the effective area of the windshield.

Another object is to distribute and apply a fluid at the point or points of the blade wiping movement.

A still further object is to provide a wiper which may be moved to a position out of the field of vision.

Another object of the present invention is to provide a wiper which may be adjustably positioned.

Another object is to provide an oscillating wiper having a high rate of wiper blade travel.

Another object is to provide an oscillating wiper having an uninterrupted wiper blade movement.

Another object is to provide an oscillating wiper having a rotary wiping action.

A still further object is to provide an oscillating wiper which in operation distributes a fluid over the windshield by centrifugal force.

Another object is to provide a rotary wiper having an effective area of operating usefulness greater than the radius of the wiper blade.

Another object is to provide a power drive which, while driving a rotary wiper at a high rate of R. P. M., is at the same time driving the whole wiper assembly at a moderate oscillating rate.

Other objects and advantages will be apparent from the following description when taken in conjunction with the accompanying drawings wherein.

Figure 1:
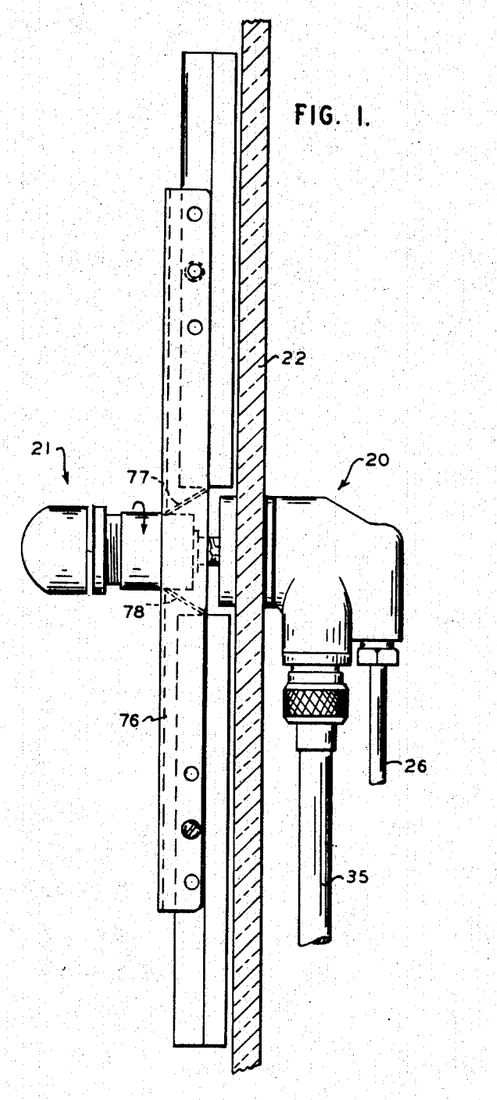
Fig. 1 is a side elevational view of one embodiment of the invention, installed in a windshield glass.
Figures 2, 3:
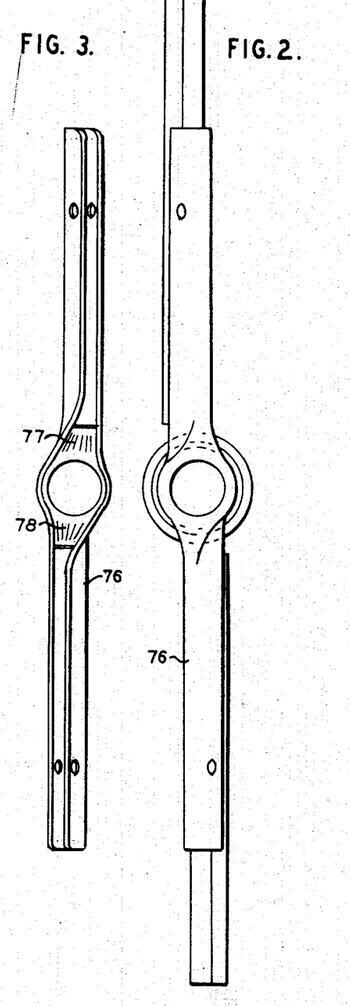
Fig. 2 is a top plan view of the wiper blades and holder.
Fig. 3 is a bottom plan view of the holder for wiper blades.
Figure 4:
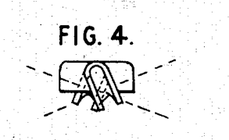
Fig. 4 is an end view of the holder for wiper blades.
Figure 5:
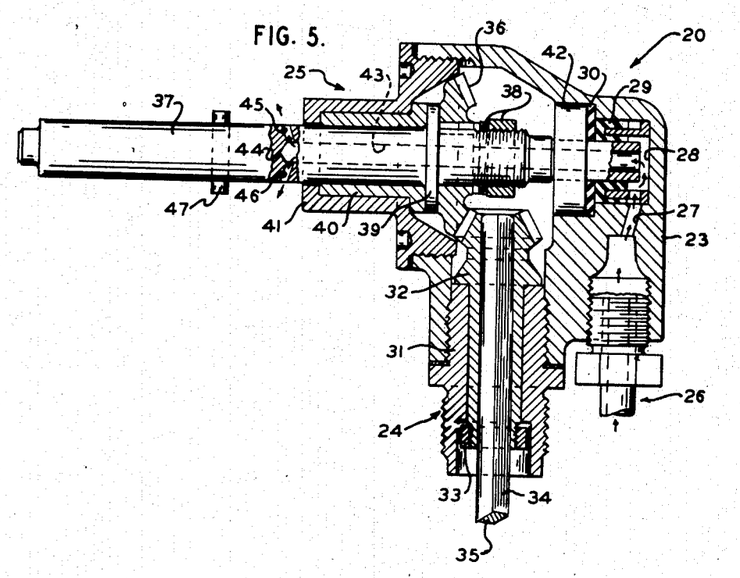
Fig. 5 is a cross-sectional view of the driver head and fluid distributing means.
Figure 6:
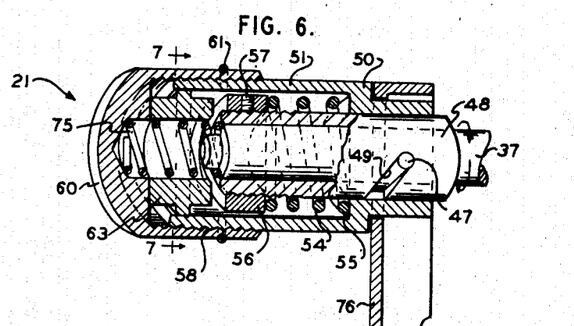
Fig. 6 is a cross-sectional view of the wiper blade mounting assembly.
Figure 7:
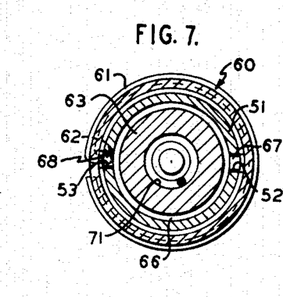
Fig. 7 is a cross-sectional view taken on line 7—7 of Fig. 6.

Referring now to the drawings wherein like reference numerals designate similar parts throughout the various views, the one embodiment illustrated in Fig. 1 is provided with two interconnected sets of mechanism 20 and 21, one upon each side of a windshield 22. The mechanism 20 is more definitely defined in Fig. 5 and comprises a housing 23 wherein two drive assemblies 24 and 25 are mounted by a screw threaded insertion. Also mounted to the housing 20 is a fluid carrying line 26 which is connected within the housing 23 by means of a duct 27 to a fluid sealed chamber 28, the seal being maintained by sealing washers 29 and 30. The drive assembly 24 comprises an externally threaded bearing member 31 which is secured to the housing 23. Within the bearing 31 a long shank bevel pinion gear 32 is mounted and held against vertical thrust by a lock nut 33. Mounted within the long shank bevel pinion gear 32 is the square end 34 of a flexible cable 35. The drive assembly 25 comprises a pinion gear 36 keyed to a shaft 37 and held in fixed relationship with the shaft by a lockwasher and nut 38 against a shoulder 39 of the shaft 37. The shaft 37 is mounted in a bearing 40 which is in turn mounted in an externally threaded casting 41, the casting 41 being threadably secured to the casting 23. The shaft 37 is also mounted in a roller bearing 42, the bearing in turn being mounted in the casting 23. The bearing 42 is pressed into the casting 23 against the fluid sealing washer 30, and the end of shaft 37 has another fluid sealing washer 29 which abuts the washer 30, all forming a fluid seal for the shaft 37 and the chamber 29. The shaft 37 has a central bore 43 leading from the chamber 28 to a point 44 which should be slightly beyond the outer edge of the casting 41 when it is drawn up to its set relationship with the main casting 23. At the point 44 two oppositely disposed holes 45 and 46 are drilled from the exterior of the shaft 37 to the internal bore 43. The holes are radial but preferably with a slight cant. The function of this internal passage will be explained hereafter. Also positioned in the extended solid portion of the shaft 37 is a pin 47, which is really a part of the assembly 21. The mechanism 21 is more definitely defined in Fig. 6 and comprises a sleeve member 48 which is rotatably mounted on the shaft 37, but limited in its degree of rotation by the pin 47 and guided in its thrust or lengthwise movement by the angular cam slot 49 in the sleeve in which the pin 47 is positioned. A bearing member 50 is mounted on the sleeve 48, and has an extended cup shaped portion 51 integrally cast therewith. The cup shaped portion 51 has two oppositely cut keyways 52 and 53 in the periphery thereof. Mounted on the sleeve 48 is an overload release spring 54 which is adjustably compressed against a shoulder 55 of the casting 50 by a screw collar 56 with a set pin 57. Mounted on an externally threaded portion 58 of the cup shape end 51 of the bearing member 50 is another cup shaped member 60 which is threadably secured thereto and may be locked in a particular position by a ring locking member 61 whose end 62 is inserted through a hole in the cup shape member 60 and fitted into either the slot 52 or 53 as the case may be. Fitted within the cup shaped member 60 is a cam piece 63 having two circumferential cam formations 64 and 65, a shoulder 66 on which two oppositely disposed key projections 67 and 68 are integrally cast, a flat rear bearing face 70, and a hollow central bore 71 which goes completely through the cam piece 63. The sleeve 48 has two cam tips 72 and 73 formed integrally therewith and so positioned that they normally fit into the two circumferential cam formations 64 and 65. Thus the screw collar, after being adjustably set, will cause the spring 54 to bear against the bearing member 50 tending to thrust it to the right axially, but threadably secured to the member 50 is a cup shape member 60 which bears against the cam piece 63 and the cam piece in turn bears against the end of the sleeve member 48. Since the screw collar 56 is secured to the sleeve member 48 and the whole assembly is spring pressed against the end of the sleeve member 48, the whole assembly will remain in a fixed relationship to the sleeve member 48, except when the spring 54 is compressed in operation. Also fitted within the cup shaped member 60 is a spring 75 which normally holds the whole assembly 21 in an inoperative position with the pin 47 acting as a stop for the right extremity of the slot 49. The spring 75 is compressible between the inner portion of the cup shaped member 60 and the end of the shaft 37. Also mounted on and movable with the bearing member 50 is a wiper blade holder 76, so that the drive transmitted by the shaft 37 and pin 47 causes the pin to ride down the slot 49 to the left extremity and thus drive the blade holder 76 and assembly 21 rotatively, and at the same time cause an axial movement of the assembly and blade holder to the right. Referring back to Fig. 1, it is apparent that the blade holder 76 has a few holes in its outer extremities which permit the blade to be mounted at its center of gravity, thus insuring an equal pressure along the length of the blade. Due to the rotary movement of the wiper, the two extended arms of the wiper blade holder are slightly canted as illustrated in Fig. 4 to insure a wiping contact of the blade with the glass. The holder comprises two U-shaped arms extending in opposed relationship from a common hub. The hub portion has two angularly disposed pieces 77 and 78 between the outer walls of the U-shaped holder.

Suitable means not shown are provided to rotate the flexible shaft 35 at a high rate of R. P. M. such as 1,000 to 2,500.

A fluid is controllably fed to the outside of the windshield into the hub portion of the wiper holder 76. For this purpose the shaft 37 is hollow through a portion of its length, being open at one end thereof and hollow as far as the two ports 45 and 46. The open end of the shaft 37 is positioned in the sealed chamber 28, this chamber being connected to a supply line 26 by means of a duct 27, so that any desirable fluid may be employed; for instance, an anti-freeze mixture of glycerine and alcohol. The flow of this fluid is controlled by a valve or other means not shown. In operation, the fluid flows through the ports 45 and 46, spurts into the hub portion of the wiper holder, then the centrifugal force carries it up the angularly disposed pieces 77 and 78 to the lower portion of the leading edge of the wiper blades, and the blades pick up the fluid as it accumulates and again it is thrown outwardly by centrifugal force giving an even dispersion of the fluid over a large area.

According to the present invention, the wiper blades will remain clear of the glass 22, due to the force of the spring 75, as long as the device is inoperative, but as soon as the shaft 37 is driven at a high rate of speed, the torque through the pin 47 works against the spring 75 and forces the sleeve 48 backward which in turn moves the wiper backward to contact the glass, which is the normal operating position. Thus it is apparent that when the wiper is inoperative, the wiper blade will be clear of the glass as illustrated in Fig. 1, and when the wiper is operated the wiper blade will be moved backward to contact the glass with a slight pressure while rotating thereon.

Figure 8:
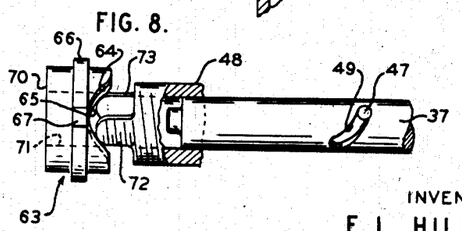
Fig. 8 is a detail illustrating the cam arrangement for lifting the wiper blades.

In the event the wiper is not operated in time to prevent irregular formations of ice or snow upon the windshield, the normal effect of starting the wiper and contacting the irregular surface of the windshield might produce a large torque on the drive shaft, perhaps sufficient to prevent the wiper from rotating and thus defeat its function of spreading an anti-freeze fluid and wiping away the film or coating on the glass. To overcome this difficulty, the present invention includes means to permit the wiper blade to pass over any obstruction on the glass surface and thus spread the anti-freeze fluid thereon, which also assists the blade in removing the film or coating or obstruction as the case may be. More specifically, when the sleeve member 48 on which the wiper blades are mounted moves backward to an operative position so that the wipers are in contact with the glass surface, the blades are exerting a slight pressure against the glass surface. The instant that this pressure is increased due to some obstruction, the sleeve member 48 will continue to rotate, but at the same time the wiper blade will be slightly retarded by the obstruction. The effect of this retardation will be a radial misalignment between the sleeve 48 and the bearing member 50 on which the wiper blades are mounted. The bearing member 50 carries with it the cam member 63 which is locked to it for rotative movement, whereas the sleeve member 48 has two cam tips 72 and 73 which are an integral part thereof and rotate therewith. It may be followed referring to Fig. 8 that the cam 63 has two circumferential cam formations 64 and 65 that are spring pressed against the cam tips 72 and 73. Therefore, it is apparent that any radial misalignment will cause the cam tips to move up on the cam faces as illustrated in Fig. 8. This causes the whole assembly 21 to move outwardly from the shaft 37 against the compression resisting spring 54, thus permitting the wiper blade to pass over whatever obstruction was retarding its rotation. It is apparent that under most circumstances the overload torque will be slight permitting the blade to pass over the obstruction and resume a normal load torque for operation.

Figure 9:
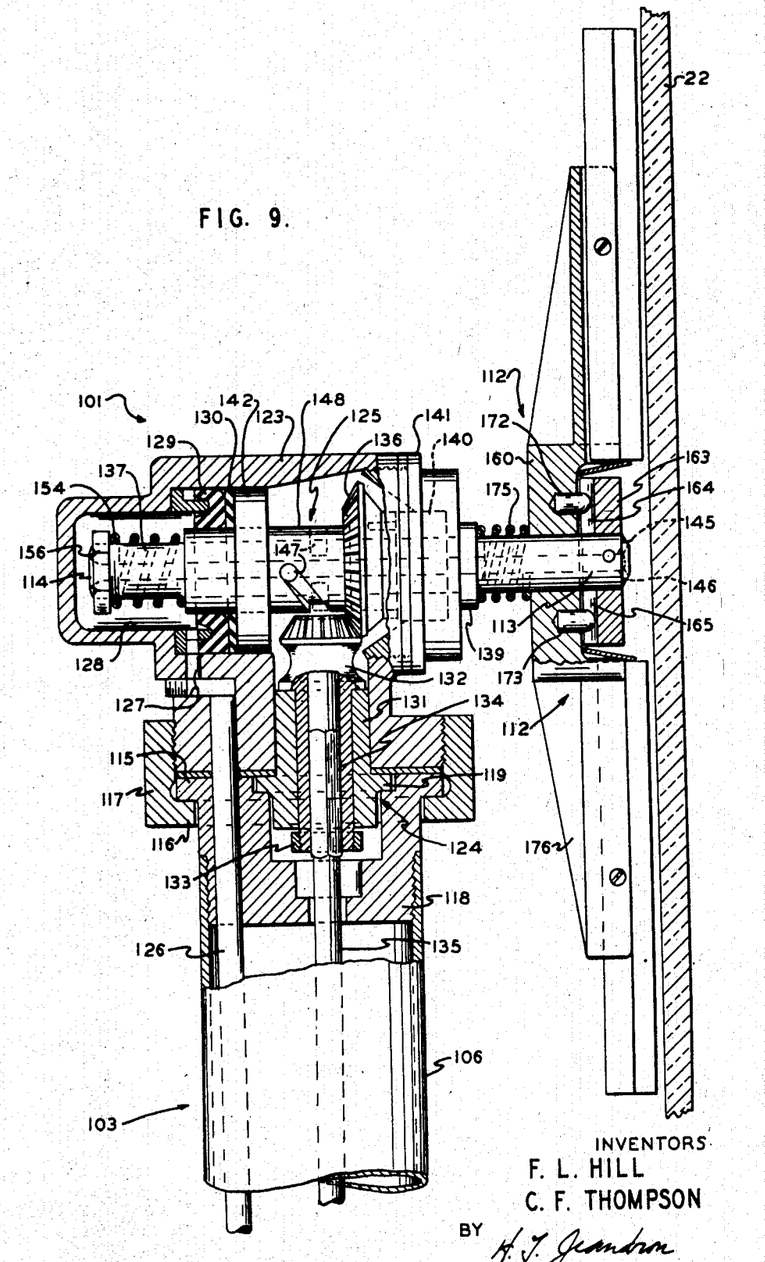
Fig. 9 is a cross-sectional view of the wiper blade and head assembly in another embodiment of the invention.
Figure 11:
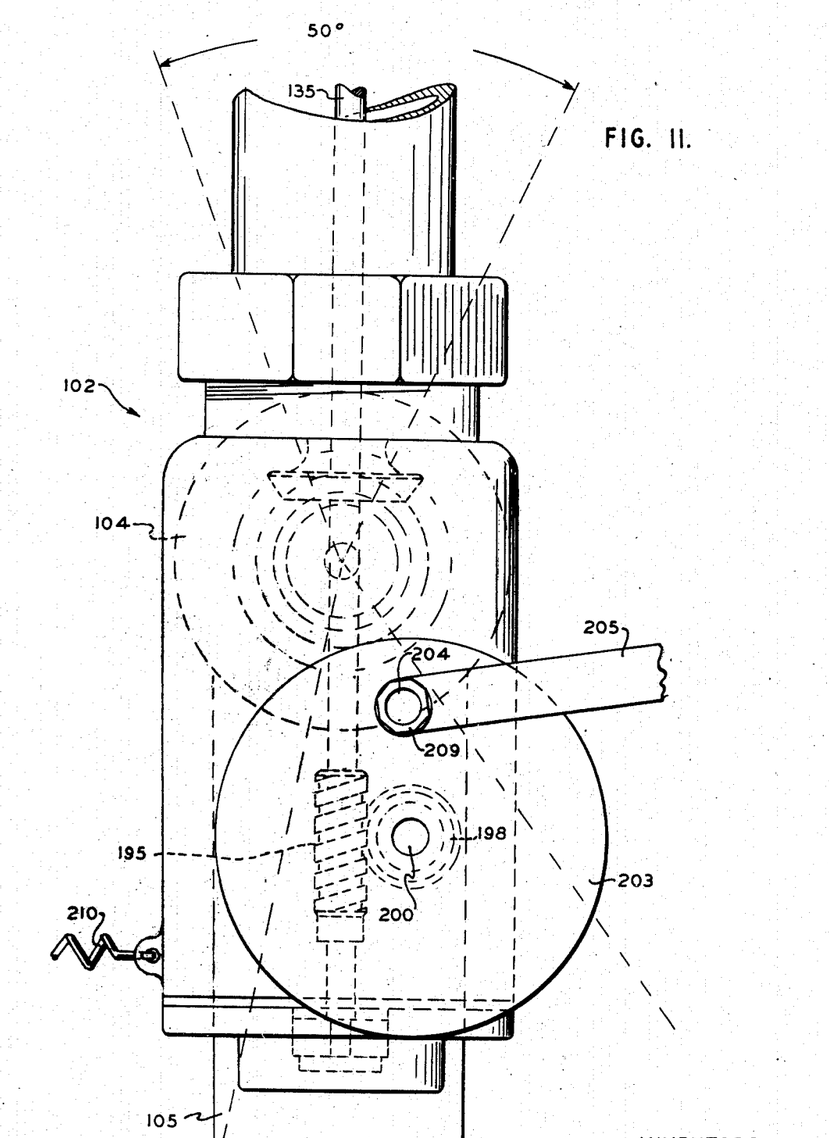
Fig. 11 is a front elevational view of the base assembly.
Figure 12:
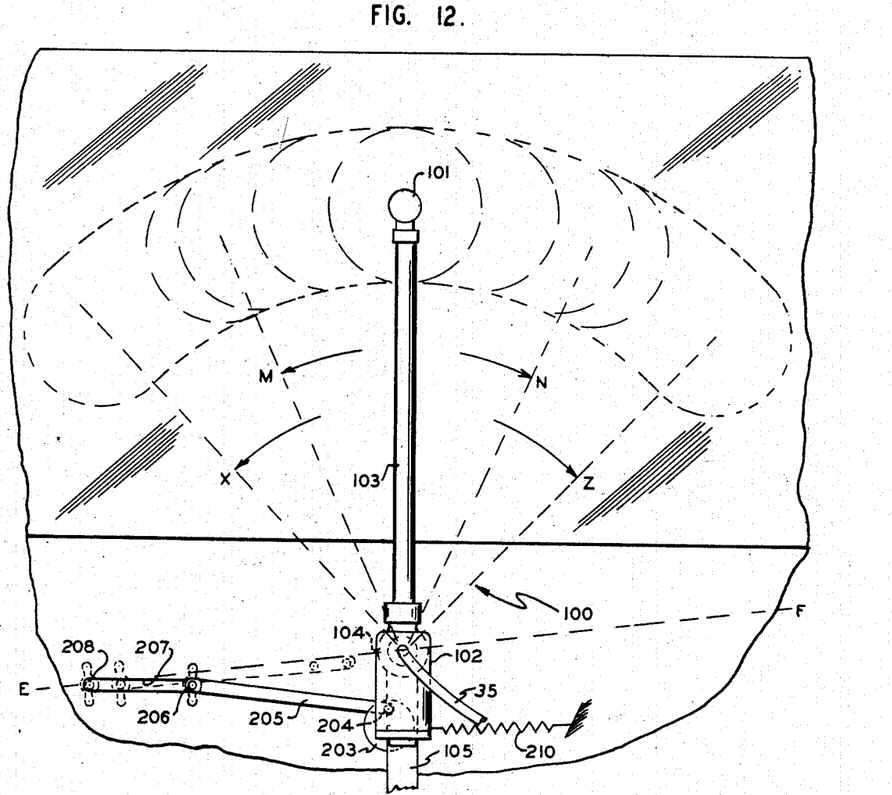
Fig. 12 is a front elevational view of the complete assembly of one embodiment of the invention associated with a windshield.

In another embodiment of the present invention, wherein all the features of the embodiment already disclosed are retained and certain modifications introduced, there is a single assembly of the mechanism 100 mounted at some appropriate point not shown so that the wiper blades are positioned slightly in front of the windshield glass as illustrated in Fig. 9 and free to oscillate in a given path as illustrated in Fig. 12. The mechanism 100 is more definitely defined in Figs. 9, 10, 11 and 12 and comprises a head assembly 101, a base assembly 102 and an interconnecting shaft unit 103. The base assembly 102 is revolvably mounted in a bearing 104 which is part of a supporting arm 105. The head assembly 101 comprises a housing 123 wherein two drive assemblies 124 and 125 are mounted. Also connected to a passage 127 in the housing 123 is a fluid carrying line 126. The duct 127 communicates with a fluid sealed chamber 128, the seal being maintained by sealing washers 129 and 130. The drive assembly 124 comprises a bearing member 131 which is positioned within the housing 123 and held in a fixed position by means of a shoulder 119 of the bearing member 131 being clamped between the housing 123 and the end 118 of the shaft unit 103. The end 118 is clamped against the housing 123 by means of a nut 117 which has a shoulder 116 which bears against the shoulder 115 of the shaft end 118. The nut 117 is threadly secured to the lower external portion of the housing 123. Within the bearing 131 a long shank bevel pinion gear 132 is mounted and held against vertical thrust by a lock nut 133. Mounted within the long shank pinion gear 132 is the square end 134 of a shaft 135. The drive assembly 125 comprises a bevel gear 136 keyed to a sleeve 148, which is in turn rotatably mounted on a hollow shaft 137. The shaft is held in a fixed relationship by means of a spring 154, screw collar 156, and the pins 147, 147. The pins 147 are mounted in the shaft 137 and extend into two oppositely located angular slots in the sleeve 148. The whole assembly 125 is mounted in the housing 123, by means of a bearing 142 and a bearing 140. The bearing 140 is mounted in an externally threaded casting 141. The casting is threadably secured to the housing 123. The open end 114 of the hollow shaft 137 is suspended in the chamber 128 so that the anti-freeze fluid therein may be forced through the hollow shaft. The opposite end 113 of the shaft 137 is in close proximity to the windshield glass 22 and has two oppositely positioned ports 145 and 146 in the end thereof. A wiper assembly 112 is mounted on the end 113 of the shaft 137, and restrained from axial movement by a spring 175 which is compressed between a shoulder 139 of the shaft 137 and the hub portion 160 of the wiper holder 176. The wiper holder is positioned by a cam piece 163 pinned to the end 113 of the shaft 137. The cam piece 163 has two oppositely formed cam faces 164 and 165 wherein two solid pins 172 and 173 are positioned. The pins 172 and 173 are mounted in the hub portion 160 of the holder 176 by a drive fit so that they are fixed with relation thereto. The opposite end of the pins 172 and 173 are rounded to reduce the bearing area of the pins on the cam faces 164 and 165. When the shaft 137 is inoperative, the pins 172 and 173 and the cam 163 are the means of restraining the wiper assembly 112 from rotative movement, but when the shaft 137 is driven the assembly functions as the driving means, but also permits the wiper assembly 112 to move axially under an overload torque such as produced in the wiper assembly when the wiper blades are restrained by an obstruction on the glass 22. In the event an overload torque is produced, the assembly 112, by means of the pins 172 and 173, will move to the left as illustrated in Fig. 9, the pins riding up on the cam faces 164 and 165. When the cause of overload torque is passed over or overcome, the spring 175 will return the assembly to its original position with the pins 172 and 173 in the center of the cam faces 164 and 165.

Referring now to the connecting assembly 103, we have a hollow cylindrical member 106 which is threadably secured to the end piece 118 which, when assembled, is clamped to the head assembly 101. The connecting assembly 103 is primarily a supporting member and being hollow permits the shaft 135 and the fluid carrying line 126 to pass therethrough. The opposite end of the hollow member 106 is also threadably secured to an end piece 180 which is similar to the end piece 118. The end piece 180 is clamped to an upper threaded portion 181 of the base assembly 102 by a clamp nut 182. A shoulder 183 of the assembly 103 is held by a shoulder 184 of the clamp nut 182.

Referring now to the base assembly 102, it is comprised of a housing 185 which is threadably secured to a supporting shaft 186, which is in turn rotatably mounted in the bearing 104 and locked against axial movement by a nut and lockwasher 187 which retains the shoulder 188 of the shaft 186 against the bearing 104. Mounted within the shaft 186 is a long shank bevel pinion gear 189 which is locked against axial movement by a screw collar 190 on the end of the shank of the gear. Mounted within the pinion gear is the square end 34 of the flexible shaft 35. Thus the assembly 102 is rotatably mounted and securely supported for operation. Also mounted within the housing 185 is a drive assembly 124 mounted on the shaft 135 between bearings 191 and 192. A portion 193 of the shaft 135 is square and fits within a long shank bevel pinion gear 136. Thus the drive from shaft 35, bevel pinion 189, to bevel gear 136 with which it meshes, is transmitted to the shaft 135 by means of the square shank portion of the shaft which keys into a square hole in the gear 136. The bevel gear 136 is rotatably mounted within the bearing 191 and locked against axial movement by a screw collar 194. Also mounted on the shaft 135 at its lower end is a worm 195 which is pinned thereto. The end of shaft 135 is mounted in the bearing 192 and locked thereto by means of a screw collar 196. The bearing 192 is in turn mounted in a casting cover 197 and held in a fixed relationship by means of a snap ring 198. The casting cover 197 is bolted to the main base housing 185. Also mounted within the housing 185 is a worm gear 198 meshing with the worm 195. The worm gear is mounted on and pinned to a shaft 200, and the shaft is in turn mounted between two bearings 201, 202 in the housing 185. The outer end of the shaft 200 has a flat disc 203 of fairly large radius keyed thereto, and mounted near the periphery of the disc is a pin 204 which may be secured therein by a drive fit. The pin 204 has a link arm 205 which is rotatively mounted thereon and retained in that relation by a washer and nut 209. Also mounted in the upper end of the housing 185 is the fluid carrying line 126 which connects with a passage or duct 207 which in turn connects with a fluid chamber 208. The supply line 219 is connected to the fluid chamber 208. The fluid chamber 208 is formed as a recess within a collar 210 which is mounted on a hub 211 of the housing 185 and retained in fixed relation with the housing. To insure the fluid seal of the chamber 208 there are two sealing washers 212 and 213 within the recess of collar 210.

Figure 10:
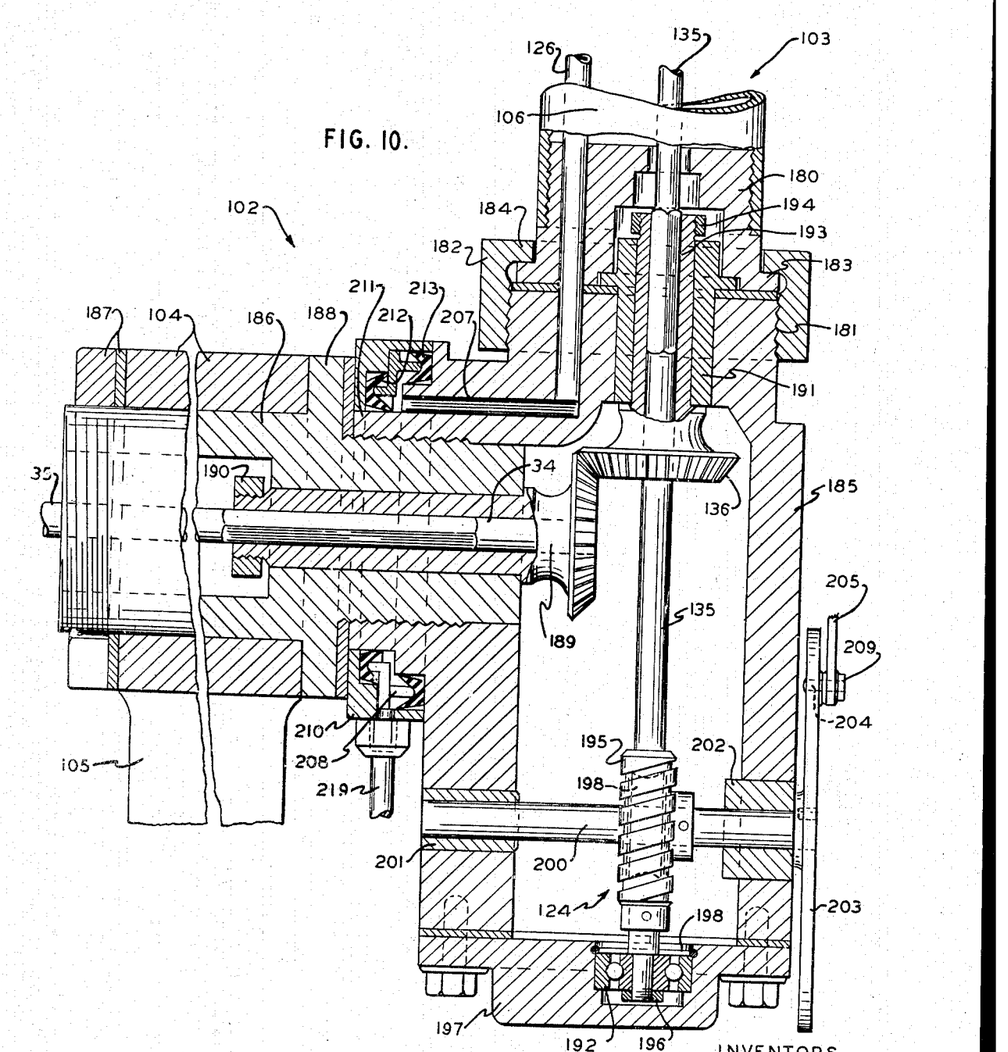
Fig. 10 is a cross-sectional view of the base assembly which supports and operates the structure illustrated in Fig. 9.

Referring to Figs. 9, 10 and 11, it is apparent that when the flexible shaft 35 is driven by a motor or other means not shown, the bevel pinion 189 will also be driven, the gear 189 in turn driving the gear 136 with which it meshes. Since the gear 136 is keyed to the shaft 135 by the square shank 193 it will drive the shaft 135 also. The shaft 135 will in turn drive the bevel pinion 132 Fig. 9 to which it is keyed by the square shank end 134. The bevel pinion 132 will in turn drive the bevel gear 136 with which it meshes. Since the bevel gear 136 is keyed to the sleeve 148, the sleeve will be driven with the gear. Since the sleeve 148 has two oppositely positioned angular slots in its periphery through which pins 147, 147 are positioned, any clockwise rotation (as viewed from the right hand side) will cause the pins to ride up the cam slot against the compressive force of the spring 154. Thus as the torque increases, the shaft 137 will move axially to the right and at the same time the shaft will be driven in a clockwise direction by the sleeve 148. When rotation ceases, the force of the spring 154 will cause the pins 147, 147 to move down the cam slot, which at the same time moves the shaft axially to the left to its initial position. It is readily seen that movement of the shaft 137 to the right will carry the wiper assembly 112 to the right and bring the wiper blades in contact with the glass 22 with a slight pressure to insure a wiping action. During the rotation of the blades, if there is any obstruction to their rotation, there is an overload torque produced which in turn causes the pins 172 and 173 to ride up on the cam faces 164 and 165 against the force of the spring 175. This action carries the wiper assembly 112 to the left allowing the blades to pass the obstruction to their rotation. The spring 175 will return the wiper assembly 112 to the right to its operative position when the excessive torque has been eliminated.

Referring to Figs. 10 and 11, since the shaft 135 is driven it will in turn drive the worm 195 and that will in turn drive the worm gear 198. Since the worm gear 198 is keyed to the shaft 200, the shaft will be driven and the disc 203 which is keyed thereto. Referring to Fig. 11, it is apparent that the disc 203 will carry the pin 204 in a circular path, and since the pin 204 is mounted in the link arm 205 the arm must move with the pin. Referring to Fig. 12, the link arm 205 is pivotly affixed at a point 206 in a slot 207. Since the pivot point 206 is a fixed point and the assembly 102 is mounted in a fixed bearing 104, the eccentric pin 204 when driven through its circular path will first lengthen, then shorten the effective crank arm causing an oscillating motion to the assembly 102 about the bearing 104. Since the assemblies 103 and 101 are affixed to the base assembly 102, then the whole mechanism 100 will oscillate. The degree of oscillation will be dependent upon the size of the disc 203 or rather the radius of the pin 204 from the center of the disc 203 and the distance from the center of oscillation (the center of the bearing 104) to the center of the disc 203. In the particular example illustrated herein as in Fig. 11, there is an approximate range of 50° of oscillation, which is also graphically shown in Fig. 12 wherein the member 103 oscillates between points M and N. It is readily apparent that the member 103 may be oscillated a greater or lesser amount as between points X and Z by varying the effective crank arm.

Another feature of the illustration in Fig. 12 is the adjustable positioning of the assembly 100, so that it may be moved out of the field of vision. This is accomplished by moving the fixable pivot point 206 to an extreme point 208, which drops the assembly 100 somewhere near the line E—F. To insure the assembly moving to its proper position when the fixable pivot point is released, a spring 210 is attached to the base assembly 102 and to some fixed point in the outer structure not shown.

Figure 13:
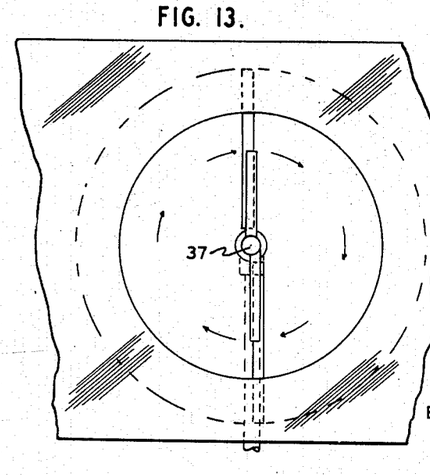
Fig. 13 is a front elevational view of another embodiment of the invention associated with a windshield.

The useful area treated in both embodiments of the present invention is graphically illustrated in Figs. 12 and 13. In Fig. 12 the area may be varied by changing the effective crank arm, whereas in Fig. 13 the shaft 27 being fixed, the area treated is dependent upon the size of blade used and becomes a fixed area for all purposes.

The application of the present invention as illustrated in Fig. 13 will permit the highest degree of efficiency over the area treated and at the same time effect a radiating area about the point 37 when the anti-freeze fluid is being used, whereas the embodiment illustrated in Fig. 12 will permit a greater area of treatment with perhaps a slightly lesser degree of effectiveness under extreme conditions.

The embodiment of the invention herein disclosed is merely illustrative and may be modified and departed from in many ways without departing from the spirit and scope of the invention as pointed out in and limited solely by the appended claims.

What is claimed is:

1. A windshield wiper comprising, in combination, a wiper blade mounted in the windshield so that the wiper blade is close to but not in contact with the surface thereof, means including ports near the inner end of said blade for feeding liquid to the inner end of the blade, means to drive the wiper blade rotatably, means to permit the wiper blade to move into contact with the surface of the windshield when the wiper blade rotation starts, means to distribute the liquid from the said ports near the inner end of the blade over a predetermined area by centrifugal force, means to allow the wiper blade to move away from the windshield surface momentarily when an obstruction to its rotation is encountered although still distributing the fluid, and means to remove the wiper blade from the windshield surface when rotation stops.

2. A windshield wiper comprising, in combination, a wiper blade mounted near the windshield so that the wiper blade is close to but not in contact with the surface thereof, means including ports near the inner end of said blade for feeding liquid to the inner end of the blade, means to drive the wiper blade rotatably and oscillatory, means to permit the wiper blade to move into contact with the surface of the windshield when the wiper blade rotation starts, means to distribute the liquid from the said ports near the inner end of the blade over a predetermined area by centrifugal force, means to allow the wiper blade to move away from the windshield surface momentarily when an obstruction to its rotation is encountered although still distributing the fluid, and means to remove the wiper blade from the windshield surface when rotation stops.

3. A windshield wiper comprising driving means, a shaft, means to transmit a rotary movement and, when the rotation starts, also a limited axial movement from said driving means to said shaft, a rotary wiper blade, and an overload coupling between said shaft and said wiper blade, said coupling including means to impart to said wiper blade an axial movement in a direction opposite to that of the first-mentioned axial movement when said wiper blade encounters an obstruction.

4. A windshield wiper comprising driving means, a shaft, means to transmit a rotary movement and, when rotation starts, also a limited axial movement from said driving means to said shaft, a rotary wiper blade, an overload coupling between said shaft and said wiper blade, said coupling including means to impart to said wiper blade an axial movement relatively to said shaft in a direction opposite to that of the first mentioned axial movement when said wiper blade encounters an obstruction, and means to reverse said axial movements when rotation stops and when said blade has passed said obstruction respectively.

5. A windshield wiper as claimed in claim 4 further comprising a longitudinal member in the one end of which said wiper shaft is journalled, a pivot near the other end of said longitudinal member and about which said member is oscillatable, and a device to oscillate said longitudinal member and to swing said member with said wiper out of the user's vision, said device comprising a crank drive mounted near said other end of said member and a connecting rod, one end of said rod being connected to said crank and the other being adjustable as to the spacing of a point to which it may be secured from said pivot.

6. A windshield wiper comprising driving means, a hollow shaft having an open end and a closed end, a housing in which said open shaft end is axially movable, means including a cam device to transmit a rotary movement and, when rotation starts, also a limited axial movement from said driving means to said shaft, a rotary wiper blade, an overload coupling between said shaft and said wiper blade, said coupling including another cam device to impart to said blade an axial movement in a direction opposite to that of the first mentioned axial movement when said wiper blade encounters an obstruction, means to admit an anti-freeze fluid to said chamber and the interior of said shaft and ports in said shaft near said wiper blade to feed said fluid from the interior of said shaft to an area wiped by said blade.

7. A windshield wiper comprising a driving shaft, a sleeve, means to transmit rotary movement from said driving shaft to said sleeve, said sleeve being provided with a slot inclined with respect to the sleeve axis, a driven shaft interiorly of said sleeve and including a pin in engagement with said slot, a second sleeve mounted on said driven shaft, a wiper blade secured to said second sleeve, and a cam and a spring connection between said second sleeve and said shaft, whereby said second sleeve will be axially shifted in relation to said shaft when said wiper blade encounters an obstruction to its rotation during the rotation of said driven shaft.

8. A windshield wiper comprising a driving shaft, a sleeve, means to transmit rotary movement from said driving shaft to said sleeve, said sleeve being provided with a slot inclined with respect to the sleeve axis, a driven shaft interiorly of said sleeve and including a pin in engagement with said slot, a wiping means rotatably mounted on said driven shaft, and a member secured to said driven shaft and including cam faces projecting therefrom in axial direction, said wiping means including projections in engagement with said cam faces, and a spring so arranged as to urge said wiping means against said cam faces.

FRANK L. HILL.
CLIFFORD F. THOMPSON.